T. M. MITCHELL.
Preparing Fuel from Waste Coal.

No. 92,737.

2 Sheets—Sheet 1.

Patented July 20, 1869.

Witnesses:

Inventor.

T. M. MITCHELL.
Preparing Fuel from Waste Coal.

No. 92,737.

2 Sheets—Sheet 2.

Patented July 20, 1869.

Witnesses:
Benj Monson
Wm H. Monson

Inventor:
T. M. Mitchell
Engr

United States Patent Office.

T. M. MITCHELL, OF PHILADELPHIA, PENNSYLVANIA, ASSIGNOR TO "THE ANTHRA-CITE-FUEL-MANUFACTURING COMPANY, OF PHILADELPHIA."

Letters Patent No. 92,737, dated July 20, 1869.

IMPROVED DRYING AND BAKING-APPARATUS FOR PREPARING FUEL FROM WASTE COAL.

The Schedule referred to in these Letters Patent and making part of the same.

*To all whom it may concern:*

Be it known that I, T. M. MITCHELL, engineer, of the city of Philadelphia, in the State of Pennsylvania, have invented a new and useful Improvement in the Process and Apparatus for Utilizing the Waste Coal of the Mines, by converting the said waste into solid, inodorous lumps of pure fuel.

My said invention may be described in three parts:

First, the drying and baking-portion of the apparatus; second, the mixing-portion of the same; and third, the process; and each part may therefore be considered under three distinct specifications.

The present part of my invention relates specially to the drying and baking-apparatus; and I do hereby declare that the following is a full, clear, and exact description of the construction and mode of operation of the same, reference being had to the accompanying two sheets of drawings, making a part of this specification, in which—

Figure 1:
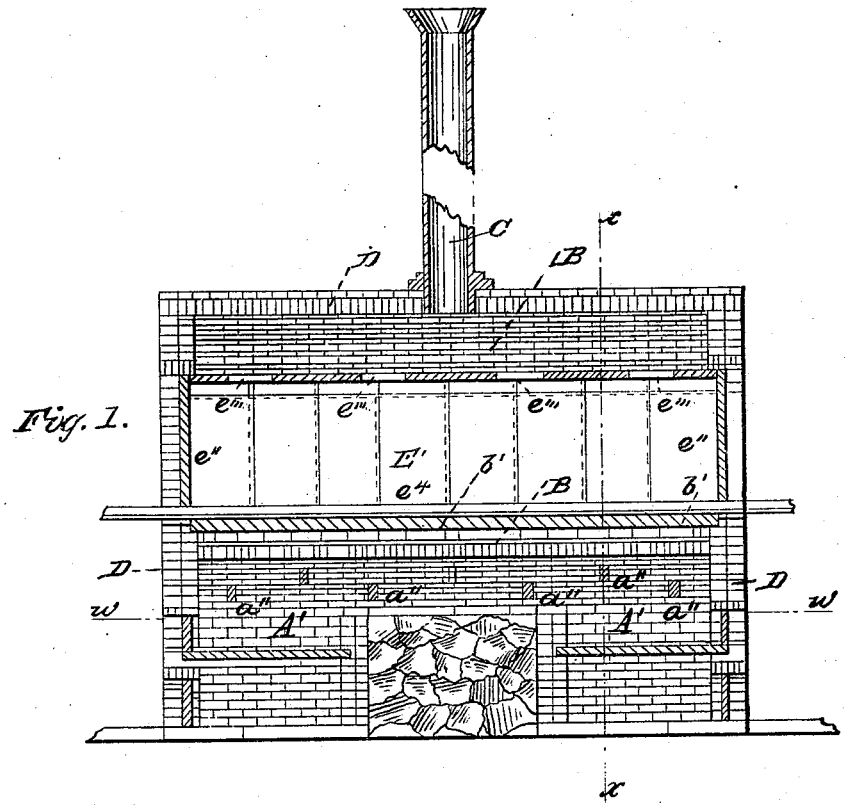
Figure 2:
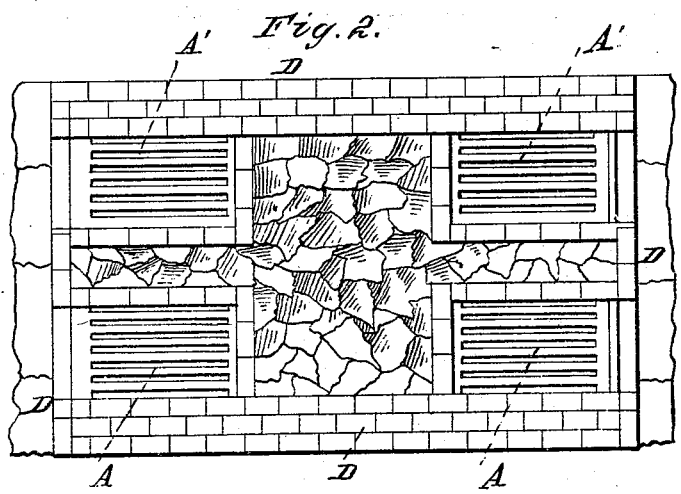
Figure 3:
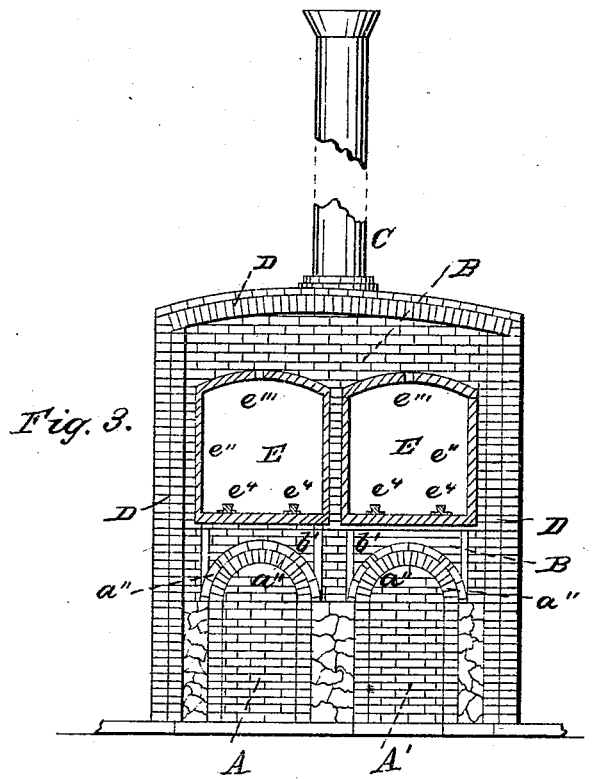
Figure 4:
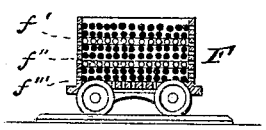
Figure 5:
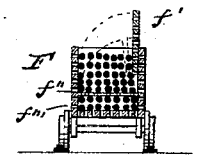

Figure 1 is a vertical central longitudinal section of the furnace and oven;

Figure 2, a horizontal section of the same, on the dotted line $w$–$w$ of fig. 1;

Figure 3, a vertical transverse section, on the dotted line $x$–$x$ of the same figure; and Figures 4 and 5, longitudinal and transverse vertical sections, respectively, of one of a series of cars for holding the new fuel while it is under treatment in the oven, and for conveying it into and out of the same.

Like letters of reference indicate the same parts when in the different figures.

Referring to the said drawings, the drying and baking parts of the apparatus consist of two or more fuel-combustion or heat-generating furnaces A A', each having an arched top, perforated with numerous small holes, $a''$ $a''$, which open directly into a large hot-air and gas-consuming chamber, B, which communicates with a suitable draught-chimney, C, the said chamber and the furnaces being enclosed together within thick walls, D D, and within the said chamber B there are, supported upon suitable posts, $b'$ $b'$, two or more ovens, E E', which open at both ends through the walls D D, the said ends being provided with closely-fitting doors, $e'$ $e''$, and the top of each of the said ovens with a central longitudinal row of small holes, $e'''$ $e'''$, which open into the hot chamber B, and the bottom of each of the said ovens provided with a railway-track, $e^4$ $e^4$, which extends beyond the vertical enclosing-walls D D. (See figs. 1 and 3.)

The cars (see figs. 4 and 5) are each made to run upon the tracks $e^4$, and into and out of the ovens E E', when required.

The body, F, of each car is made of perforated plate-iron, or heavy woven wire, is open at its top, and also divided into separate horizontal spaces, by means of adjustable or hinged platforms, $f''$ $f''$, of perforated plate-iron, so that each layer of the contents of a full car will be free from the pressure of any other layer, substantially as represented in the drawings, figs. 4 and 5.

The combustion-chambers or furnaces A A' are lined with fire-bricks, and the fuel-boxes thereof provided with grates, and with fuel and ash-doors, in the usual manner.

The ovens E E' are each made of suitably thick plate-iron, and are supported upon the posts $b'$ $b'$, in the chamber B, so as to allow the hot products of combustion, coming from the heat-generating chambers A A' below, to completely surround each, the strength of the draught through the said chamber B being governed properly by any suitable damper in the chimney C, or otherwise.

In the operation of this drying and baking part of my apparatus, the previously-formed and compressed lumps of coal which are intended to be dried and baked therein, are dropped promiscuously into the respective spaces formed by the platforms $f''$ $f'''$ of the cars, in succession, and the cars then run into the respective ovens, and the doors of the latter closed.

The car-bodies F being made of perforated plates, or woven wire, and the layers of the lumps of coal being also supported by their respective perforated platforms $f'$ $f''$ $f'''$, the heated ovens soon drive off all the moisture and the volatile or odorous portions of the lumps through the holes $e'''$ $e'''$ to the chimney, and thus bring the condition of the said lumps into the dry and inodorous state required in fuel for domestic use. The rear doors of the ovens are now to be opened, and the cars drawn out, and their contents discharged for cooling, and subsequent delivery for use.

What I claim as my invention, and desire to secure by Letters Patent, is—

The heat-generating furnaces A A', the hot-air and gas-consuming chamber B, and the drying and baking-ovens E E', the said parts being constructed, arranged, and enclosed together within suitable walls D D, and operating together, substantially as described, for the purpose specified.

Also, when used in connection with a drying and baking-oven, constructed and arranged to operate substantially as and for the purpose described, a railway-car, F, having its containing-body and its platforms made of perforated plate-iron or coarse woven wire, substantially as and for the purpose described.

T. M. MITCHELL, *Eng.*

Witnesses:
BENJ. MORISON,
WM. H. MORISON.